Patented May 14, 1935

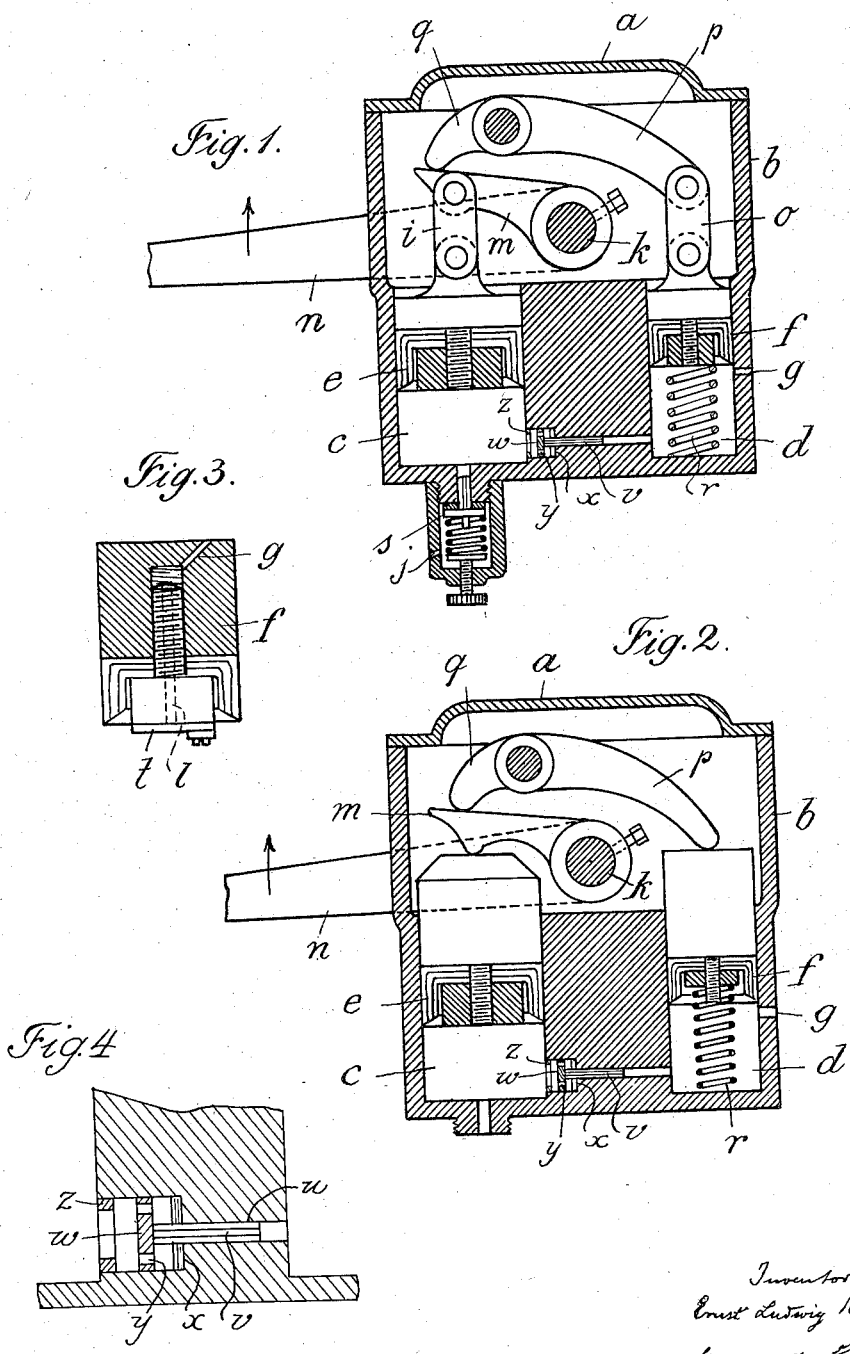

2,001,202

UNITED STATES PATENT OFFICE 2,001,202

SHOCK ABSORBER

Ernst Ludwig Kunze, Chemnitz, Germany

Application March 1, 1933, Serial No. 659,033
In Germany March 4, 1932

3 Claims. (Cl. 188—88)

This invention relates to pneumatic shock absorbers which comprise a second cylinder with piston for preliminary compression of the air.

With the known shock sbsorbers of this type the compression of at least 7 to 8 atmospheres necessary for an effective shock absorption can only be obtained by making the second cylinder (auxiliary pump) of very large diameter. The shock absorber must therefore be of very large dimensions, unfavorably influencing the appearance of the vehicle. Further, the known constructions have piston rods extending through the casing, this being objectionable because in service leakages can easily occur at the points of penetration.

The invention overcomes these objections, and with this object in view two pistons are mounted in cylindrical spaces in the casing, the rocker lever of the shock absorber acting on one of the two pistons by means of a cam, whereas the second piston (auxiliary pump) is influenced by a lever mechanism for increasing the stroke of the first piston.

Two embodiments of the invention are illustrated by way of example in the accompanying drawing in which:—

Fig. 1 shows in vertical section a shock absorber with auxiliary pump.

Fig. 2 is a similar view of a modified form of construction.

Fig. 3 shows a detail in section.

Fig. 4 shows on a larger scale in longitudinal section the check valve in open position.

The shock absorber consists of a casing $b$ closed by a cover $a$. In the casing $b$ two cylindrical chambers $c$ and $d$ for pistons $e$ and $f$ are arranged. The chamber $c$ with piston $e$ forms the shock absorber and the chamber $d$ with piston $f$ the auxiliary pump. The pistons are packed relative to the cylinder walls by leather sleeves. The wall of the auxiliary cylinder has below the piston $f$ a port $g$ through which air can be drawn by the piston $f$. A check valve $h$ is arranged between the two cylinders. The piston $e$ is connected by a link $i$ to a lever $m$ keyed on an axle $k$. A lever $n$, connected in known manner by a connecting rod to the oscillating portion of a machine or to the axle of a vehicle and arranged outside the casing $a$, is keyed on the axle $k$ and imparts a reciprocating rotary motion thereto.

In the form of construction illustrated in Fig. 1 the piston $f$ of the auxiliary pump is connected by a link $o$ to a two-armed transmission lever $p$, $q$ arranged above the lever $m$. The short arm $q$ of this transmission lever bears against the lever $m$ so that the transmission lever participates in the oscillating movements.

The links $i$ and $o$ may also be omitted. In this instance a pressure spring $r$ is for example arranged below the piston $f$ and pushes the same against the arm $p$ of the transmission lever so that this arm is returned into its raised position as shown in Fig. 2.

An adjustable valve $s$ must automatically open when a certain compression pressure is reached in order to allow air to escape through a port $j$.

The shock absorber operates on a vehicle in the following manner:—When the vehicle travels over a bump, the lever $n$ of the shock absorber secured to the chassis is oscillated in the direction of the arrow so that the piston $f$ of the auxiliary pump is moved downwards by means of the lever mechanism $m$, $q$, $p$ and the air in the cylindrical chamber $d$ is compressed and forced into the cylindrical chamber $c$. The check valve $h$ prevents the backward flowing of the air. This check valve $h$, as shown in Fig. 4, comprises a spindle $u$ provided with longitudinal grooves $v$, whereas the valve disc $w$ mounted on the end of the spindle $u$ has apertures $y$ through which the preliminarily compressed air can escape from the chamber $d$ into the chamber $c$ when the valve is open. A ring $z$ arranged in the mouth of the valve passage serves as abutment for the opened valve and prevents the valve from being forced entirely out of the passage. A packing disc $x$ is fitted on the valve seat. Owing to the fact that the two arms of the transmission lever $p$, $q$ are of very different lengths in order to obtain the greatest possible ratio of transmission, a relatively large stroke of the piston $f$ and consequently a high preliminary compression are obtained. During the return movement of the piston $f$ in upward direction under the action of the spring $r$ air is drawn in through the port $g$, thus exposed. This operation repeats itself at each oscillation, so that the air in the main cylinder $c$ is repeatedly compressed until the limit determined by the valve $s$ and resulting from the piston travel is reached. Consequently, the descending piston $e$ encounters considerable resistance and thus damps the upwardly directed shock in an extremely effective manner. A certain damping, however, also takes place during the upward movement of the auxiliary piston $f$ under the action of the spring $r$ so that the effect of the carriage suspension is further assisted.

In order to make the effect of the auxiliary pump absolutely independent of the amplitude of the oscillations or of the length of the stroke, it is advisable to locate the air admission port *g* not in the cylinder wall, but in the piston itself, for example the port *l* as shown in Fig. 3. The piston *f* is then provided with a check valve *t*.

When employing a valve of this construction it is evident that air must be able to enter the upper part of the casing *b*. For this purpose either a bore is provided in the cover *a* or there is sufficient leakage between the cover and the casing, seeing that the cover does not fit hermetically.

I claim:—

1. A pneumatic shock absorber with preliminary compression, especially for motor vehicles, comprising in combination a casing having two cylindrical chambers, a main piston in one of said chambers, an auxiliary piston in the other of said chambers, a two-armed rocker lever with one arm acting upon said auxiliary piston, an operating shaft between said chambers, and a one-armed lever keyed on said shaft and extending between said main piston and the other arm of said two-armed lever, said one-armed lever adapted to rock said two-armed lever to actuate said auxiliary piston.

2. A pneumatic shock absorber with preliminary compression, especially for motor vehicles, comprising in combination a casing having two cylindrical chambers, a main piston in one of said chambers, an auxiliary piston in the other of said chambers, a two-armed rocker lever, a link connecting one arm of said rocker to said auxiliary piston, a second link connecting said one-armed lever with said main piston, an operating shaft between said chambers, and a one-armed lever keyed on said shaft and extending between said main piston and the other arm of said two-armed lever, said one-armed lever adapted to rock said two-armed lever to actuate said auxiliary piston.

3. A pneumatic shock absorber with preliminary compression, especially for motor vehicles, comprising in combination a casing having two cylindrical chambers, a main piston in one of said chambers, an auxiliary piston in the other of said chambers, a two-armed rocker lever with one arm acting upon said auxiliary piston, an operating shaft between said chambers, and a one-armed lever keyed on said shaft and extending between said main piston and the other arm of said two-armed lever, said one-armed lever adapted to rock said two-armed lever to actuate said auxiliary piston, and a shock transmission lever keyed on said operating shaft adapted to rotate said shaft to swing said one-armed lever and operate said auxiliary piston.

ERNST LUDWIG KUNZE.